United States Patent [19]

Doty

[11] Patent Number: 4,498,642
[45] Date of Patent: Feb. 12, 1985

[54] SEAT BELT RETRACTORS

[75] Inventor: Gerald A. Doty, Crown Point, Ind.

[73] Assignee: Gateway Industries, Inc., Hazel Crest, Ill.

[21] Appl. No.: 472,634

[22] Filed: Mar. 7, 1983

[51] Int. Cl.$^3$ .................. A62B 35/02; B65H 75/48
[52] U.S. Cl. .................. 242/107.4 A; 242/107.7; 280/806; 280/808
[58] Field of Search .............. 242/107.4 A, 107.7, 242/107.6, 107.12, 99; 280/806, 807, 808; 297/478, 480

[56] References Cited

U.S. PATENT DOCUMENTS

| | | | |
|---|---|---|---|
| 2,209,467 | 7/1940 | Moore | 242/99 |
| 3,700,184 | 10/1972 | Francis | 242/107.6 X |
| 4,040,645 | 8/1977 | Giffen et al. | 242/107.4 A |
| 4,245,798 | 1/1981 | Steger | 242/107.4 A |
| 4,253,622 | 3/1981 | Nishina | 242/107.4 A |
| 4,307,853 | 12/1981 | Higbee et al. | 242/107.7 |
| 4,385,737 | 5/1983 | Gulette | 242/107.7 |
| 4,427,164 | 1/1984 | Rumpf | 242/107.4 A X |

FOREIGN PATENT DOCUMENTS 2077575 12/1981 United Kingdom ........ 242/107.4 A

*Primary Examiner*—John M. Jillions

*Attorney, Agent, or Firm*—Fitch, Even, Tabin & Flannery

[57] ABSTRACT

In a dual spool seat belt retractor system where one retractor reels in a shoulder belt and another retractor reels in a lap belt and at least one of the retractors, e.g., the shoulder belt retractor, has an associated tension relieving mechanism which relieves the winding spring tension from the belt worn by the occupant, a device associated with the tension relieving mechanism for releasing the mechanism from its tension relieving mode is actuated by a cable extending between the two retractors. One end of the cable is connected to the release device and the other end is connected to the lap belt retractor in a manner that is senses full lap belt retraction. In a preferred embodiment, the cable is looped partially around the windings of the lap belt retractor so that as the diameter of the lap belt winding increases during lap belt retraction, the cable loop expands causing the other cable end to pull on the release device. The cable actuator is adaptable to a two retractor seat belt system irrespective of the relative orientations of the two retractors. A mechanism is also provided to allow the retractor to be mounted at several angles to the vertical, e.g., 45° and still use the vertical displacement of an inertia member to lock the retractor.

4 Claims, 18 Drawing Figures

SEAT BELT RETRACTORS

The present invention relates to a safety belt system and more particularly to a retractor system.

Many vehicles, such as private automobiles, employ three-point seat belt systems with a continuous belt, including a belt portion extending across the lap of the passenger and belt portion extending across the shoulder of the passenger and a single reel used to retract both continuous portions. However, in larger vehicles, such as truck tractors, it is still common to install dual spool retractor systems in which an individual lap belt and an individual shoulder belt are each entrained about reels of individual retractors. The lap belt reel is manufactured without a tension relieving mechanism because slack is undesireable in that a person might possibly submarine under a loose lap belt. However, the belt which extends across the passenger's shoulder asymmetrically with respect to his body may cause some person's slight discomfort if reel spring tension is not relieved. Accordingly, tension relieving mechanisms, such as those described in U.S. Pat. Nos. 4,124,175 and 4,065,072, are commonly provided in association with the shoulder belt reel to alleviate seat belt retraction tension on the shoulder of an occupant.

Tension relieving mechanisms, in their various forms, provide means to lock the seat belt retraction mechanism from retracting the seat belt beyond a certain point when the belt is extended across the occupant's body. Typically, the tension relieving mechanism is actuated subsequent to buckling the belt across the passenger's body by pulling the belt a short distance outward and then releasing the belt. For the comfort of the passenger, the tension relieving mechanism is preferably provided with a "memory" that allows the belt to be protracted a short distance without releasing the mechanism from its tension relieving mode, the passenger being allowed to move relatively freely within his seat without releasing the mechanism.

In order that the seat belt be allowed to retract when the passenger leaves the vehicle, means are generally associated with tension relieving mechanisms to release these mechanisms from their tension relieving mode when an event, such as belt unbuckling or door opening, occurs. An example of a door-actuated release device is described in U.S. Pat. No. 4,065,072. Door-actuated release device, may be relatively complex and may add significantly to the force required to close the vehicle door. Where two retractors are used to retract two individual belt portions of a seat belt system, the shoulder belt retractor having a tension relieving mechanism and the lap belt having no tension relieving mechanism so that the lap belt mechanism immediately retracts the belt when it is unbuckled, it has been proposed to provide a device which is actuated by rewind of the lap belt for releasing the tension relieving mechanism associated with the shoulder belt retractor allowing it to also rewind its belt. Relatively simple mechanisms have been proposed for coupling lap belt retraction to release of the tension relieving mechanism where the retractors are aligned with their reel shafts parallel.

The configuration of seat belt systems is often dictated more by the interior configuration of the vehicle than by desired simplicity of seat belt system design, and typically, the interior configuration of the vehicle requires that the shoulder belt reel and lap belt reel rotate about non-parallel shafts. In such cases, the interconnection between the non-relieved retractor and the relieved retractor for actuating release of the tension relieving mechanism upon retraction of the non-relieved retractor becomes more complicated, and relatively complex mechanisms, such as gear mechanisms, have been proposed to effect such interconnections. Such complicated mechanisms add substantially to the cost of the seat belt system and in many cases increase the weight and/or bulkiness of the seatbelt system.

Typically, these inertia operated retractors work quite well when the pendulum is at 22.5 degrees or less to the vertical as is the usual installation in a passenger automobile. In trucks having dual spool retractors, the lap belt retractor is often mounted at much more severe angle to the vertical, such as 45 degree, to the vertical. In such instances, the usual pendulum mounting and lock lever operation to lock the ratchet wheels can not be used. Thus, there is a need for an inexpensive and simple pendulum and lock bar actuation system for retractors mounted at various severe angles to the vertical.

It is a primary object of the present invention to provide a new and improved retractor system.

A further object of the invention is to provide an improved means for releasing tension relieving mechanism associated with one of the retractors of a two-retractor seat belt system upon retraction of the belt associated with the other retractor, irregardless of the relative orientations of the two retractors.

A still further object of the invention is to provide a new and improved inertia pendulum and lock bar actuating mechanism for retractors mounted at severe inclinations to the vertical.

These and other objects and advantages of the present invention will become more apparent from the following detailed description of the invention with reference to the accompanying drawings:

As shown in the drawings for purposes of illustration, the invention is embodied in a seat belt system including a pair of seat belt retractors 10, 10' which are of conventional design. The retractors, as is typical, each includes an emergency operating locking mechanism, indicated generally at 12, 12', which normally provides for free retraction direction rotation of its respective webbing reels 13, 13' under normal circumstances but quickly locks to prevent belt webbing 14, 14' protraction in emergency situations, such as an accident, resulting in the passenger being firmly held by the belts 14, 14' against forward travel within his seat. The illustrated locking mechanisms 12, 12' are of the vehicle inertia type (although other types of locking mechanisms might be used) in which each mechanism has a pendulum weight 16, 16' mounted on a support bar 18, 18' for swinging movement. The weights 16, 16' swing upon sensing a sudden change in vehicle velocity, and shift a pivotably mounted locking bar 20, 20' or pawl into locking engagement with ratchet wheels 22, 22' mounted along the sides of the seat belt webbing reel 13, 13'. The ratchet wheels 22, 22' are connected to the reel shafts 24, 24' that extend journaled for rotation between opposite frame sides 26a, 26b, 26a', 26b' of the retractor frame 28, 28'. A spirally wound clock-like spring 30, 30' is attached to one of each reel shaft 24, 24' for rewinding the belts, each spring being mounted within a protective cover 31, 31' attached to a frame side.

In the illustrated embodiment, the upper retractor 10 for retracting the shoulder belt 14 and the lower retractor 10' for retracting the lap belt 14' are mounted from a backing plate 32 of a common retractor housing. The shoulder belt retractor 10 is disposed vertically with its pendulum weight 16 disposed perpendicularly to the axis of the retractor shaft 24. The lap belt 10', on the other hand, is shown tilted with respect to the vertical, its shaft 24' being disposed at about a 46° angle with respect to the vertical.

A considerable problem results in the sensivity and fail-proof actuation of the locking bar to engage and lock the ratchet wheels when the retractor is tilted beyond 22.5 degrees to vertical. In such instances, the pendulum's rocking movement may have considerable upward components of movement that do not directly result in a comparable outward movement of the lock bar along the 22.5 degree angle. That is, the pendulum may rock in certain directions without shifting the lock bar sufficiently to engage and lock the ratchet wheels. When approaching 45 degrees, as illustrated for the lap belt retractor herein, the tolerances become such that much of the vertical movement of the pendulum head tends to merely slide the lock bar along its pivot axis but without the desired shifting movement at 90 degrees to the lock bar axis.

Figures 14, 15:
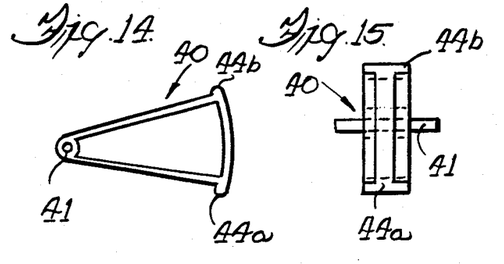
FIG. 14 is a side elevation view of a lever or hammer which transmits motion from the pendulum in the lower retractor of FIG. 1 to the pawl.
FIG. 15 is a rear end view of the hammer of FIG. 14.

In order to assure locking of the tilted lap belt retractor 10' in times of emergency, its associated pendulum 16' is mounted on a support bar 18' that extends horizontally from one of the frame sides, i.e., at an angle with respect to the frame side. The locking bar 20' on the other hand, is mounted for pivotal movement about an axis parallel to that of the shaft 24'. Unlike in vertically mounted retractors, such as the illustrated shoulder belt retractor 10, in which an upper end 38 of pendulum acts directly upon the locking bar 20, in the tilted retractor 10' a pivotally mounted sector-shaped lever or hammer 40 (best seen in FIGS. 14 and 15) is used to transmit vertical displacement of the upper pendulum head 38' to actuate locking bar 20' to its locking position and is pivotally mounted by a pin 41 to an extension 42 of the frame 28' and has one contact 44a at the end of its arcuate edge in contact with a curved upper end 38' of the pendulum 16' and another contact 44b in contact with the locking bar 20'. Irrespective of the direction of pendulum swing, upon disturbance, the pendulum upper end 38' acts to pivot the hammer 40 upwards, activating the locking bar 20' to engage the ratchet 22' wheels.

A preferred tension relieving mechanism, illustrated in FIG. 4, in terms of which the invention will be described includes a coil spring clutch having a coil spring 50 that alternately contracts to engage a clutch surface 48 associated with the reel shaft 24, and is expanded to disengage from the clutch surface. Herein the clutch surface 48 is the outer surface of a cylindrical member 52 which radially extends an axially extending portion 54 of the retractor shaft 24. The spring 50 is disposed within a body member 55 attached to the frame side 26a opposite the retractor spring 30 and has an axially inward, radially extending end tang 58 and an axial outward, radially extending end tang 60. The tangs 58, 60 engage various camming and stopping surfaces on the body member 55, resulting in expansion or contraction of the spring 50 about the clutch surface 48.

Figure 7:
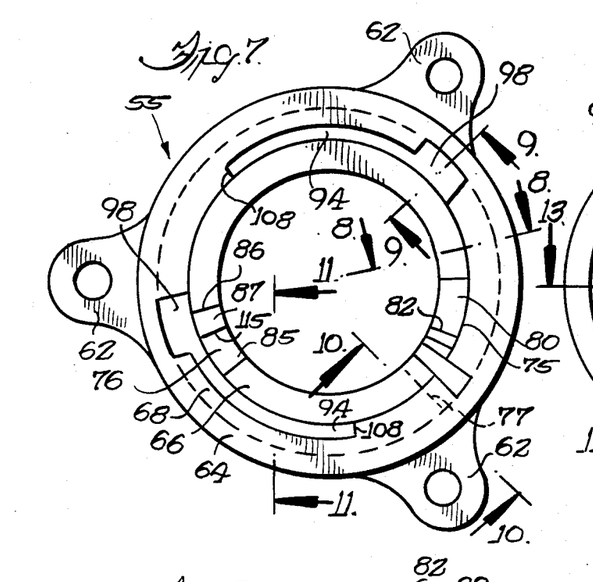
FIG. 7 is an elevation view of a body member of the tension relieving mechanism of FIG. 4.

The body member 55 has a series of cam and stop surfaces thereon to control the expansion and contract of the spring 50 as well as to stop movement of the spring 50 when it is gripping the clutch surface 48 and thereby hold the shaft against turning to rewind the belt onto the reel. The body member 55, as best seen in FIG. 7, has slideably associated therewith an unlock disc or ring 90 for turning about a common central axis when the ring 90 is associated with the body member 55. Both the end tangs 58 and 60 are associated with the body member 55 and unlock ring 90 to position the tangs, as will be explained, in detail. The body member is a molded plastic member which is fixedly mounted to the frame side 26a coaxially with the axis of the reel shaft 24.

Figure 4:
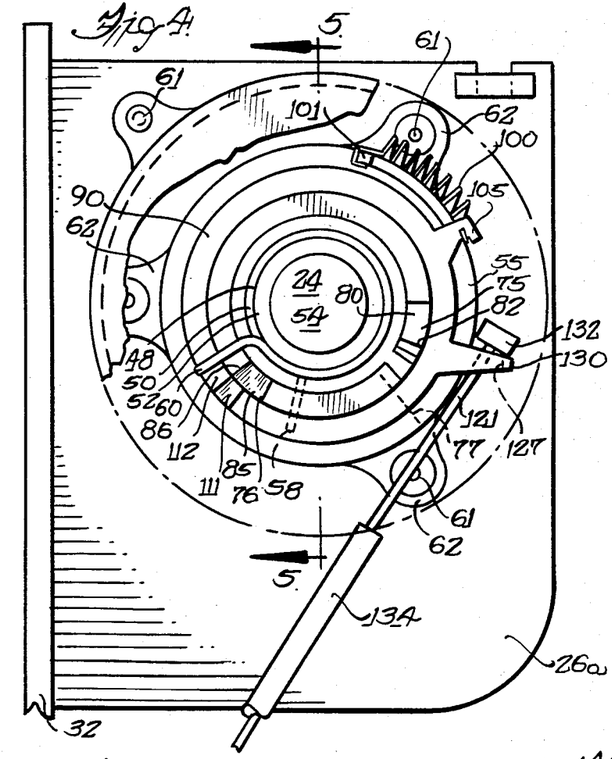
FIG. 4 is an elarged elevation view, taken along line 4—4 of FIG. 1 showing a tension relieving mechanism associated with the shoulder belt retractor with a major portion of its protective housing broken away.
Figure 6:
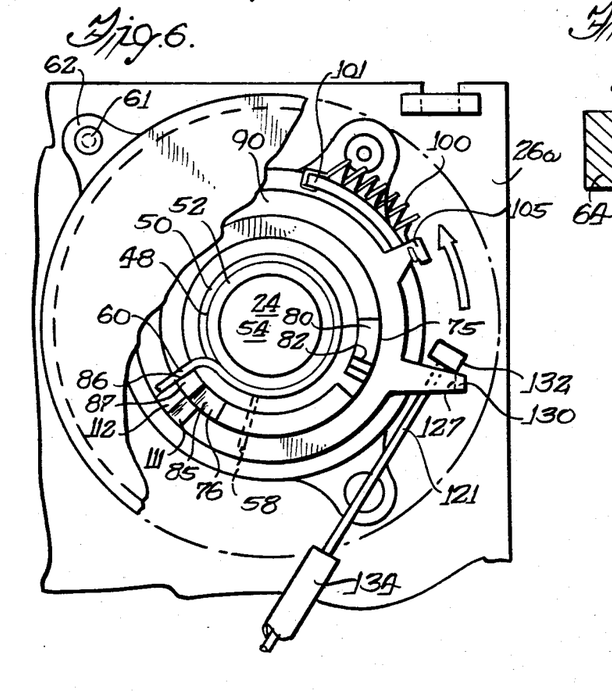
FIG. 6 is an elevation view, similar to FIG. 4, showing the tension relieving mechanism in its tension relieving mode.

The body member 55, as best seen in FIGS. 4 and 6, is generally circular and is bolted or riveted to the frame side 26a by means of three rivets 61 in three radially extending lugs 62. The body member 55 consists of a large diameter outward cylindrical portion 64 joined to a small diameter inward cylindrical portion 66 by an intermediate diameter annular ring portion 68. The coil spring 50 is disposed within the inner cylindrical portion 66 with its outer tang 60 tracking along the axially outward end 70 and its inner tang 58 tracking along the axially inward end 72 of this inner portion.

Figure 5:
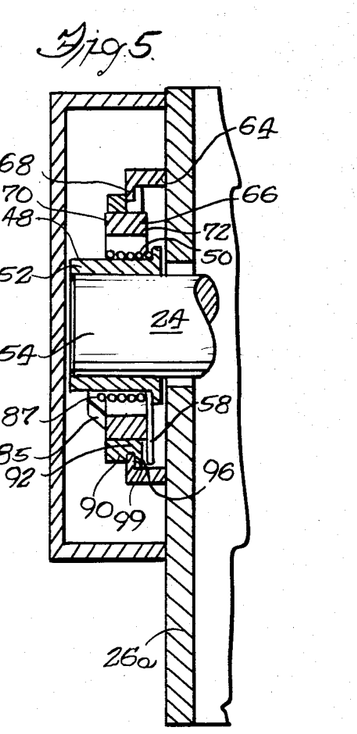
FIG. 5 is a cross-sectional view taken along FIG. 5—5 of FIG. 4.

The protraction direction of the shoulder belt shaft 24 in the illustrated mechanism is clockwise with respect to FIG. 4, the clutch spring 50 being wound clockwise with its outer tang 60 disposed about 20° clockwise of its inner tang 58. The tangs 58, 60 are shifted axially outward or inward relative to the shaft 24 by cam stops extending from the inner end 72 and outer end 70 (FIG. 5) of the inner cylindrical portion 66 of the body member 55, the outer end having a first cam stop 75 at about 4 o'clock with respect to FIG. 4, and a second cam stop 76 at about 7 o'clock with respect to FIG. 4, and the inner end having a stopping wall 77 at about 5 o'clock.

Figures 8, 9, 13:
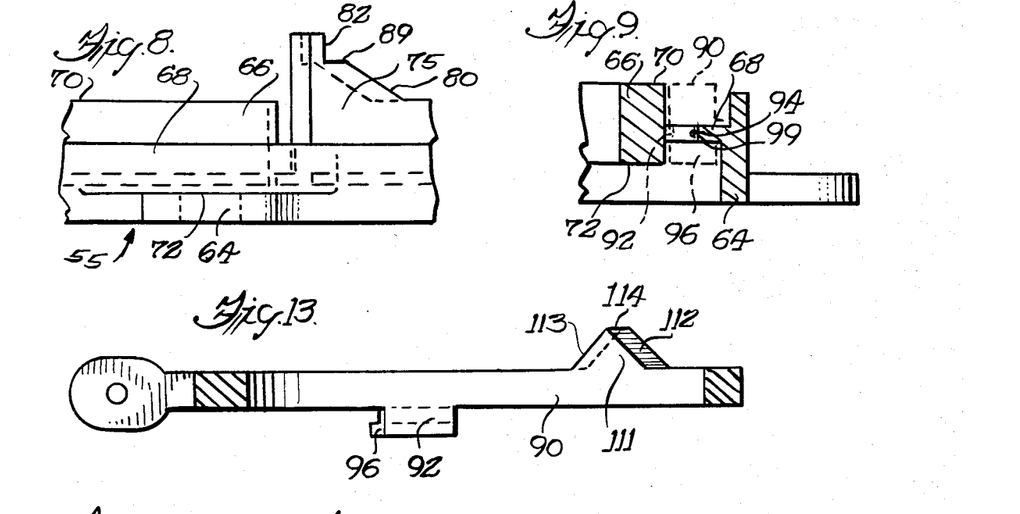
FIG. 8 is an enlarged cross-sectional view taken along line 8—8 of FIG. 7.
FIG. 9 is an enlarged cross-sectional view taken along line 9—9 of FIG. 7 showing the releasing ring of the mechanism in ghost.
FIG. 13 is an enlarged cross-sectional view taken along line 13—13 of FIG. 13.

The first (4 o'clock) cam stop 75 extends outward the greatest axial distance and includes a clockwise-facing inclined camming surface 80 (FIG. 8) and a clockwise-facing vertical stopping surface 82 which in turn engage the outer tang 60 as it sweeps in the clockwise direction. When the belt 14 is protracted, the clutch spring 50, which is gripping the clutch surface 48, rotates clockwise until the outer tang 60 reaches the inclined camming surface 80 and travels up the inclined camming surface to abut the stopping surface 82. Continued clockwise rotation of the shaft 24, with the outer tang 60 restrained by the stopping surface 82, results in radial expansion of the spring coils disengaging the spring 50 from the clutch surface 48 of the shaft 24. Because the outer tang 60 has been biased axially outward by the camming surface 80, abutment of the outer tang 60 against the stopping surface also results in axial expansion of the spring coils as the coils tend to follow the outer tang axially outward and are yet restrained by the inner tang 58 held inward by the inner end 72 of the inner cylindrical portion 66. If the shaft 24 subsequently rotates counterclockwise, the coils of the spring 50 immediately radially contract leaving the spring in its axially expanded state.

Figure 10:
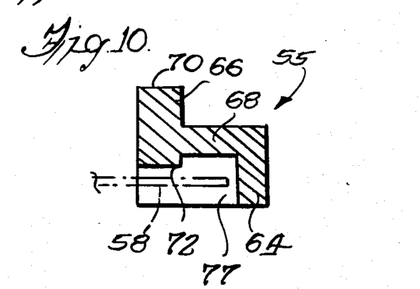
FIG. 10 is an enlarged cross-sectional view taken along line 10—10 of FIG. 7 showing a tang of the clutch coil spring in ghost.

The stopping wall 77 (FIG. 10) at the inner end 72 of the inner cylindrical portion 66 acts to stop the inner tang 58 as it sweeps in the clockwise or belt retraction direction. When the inner tang 58 hits the wall 77, the clockwise-wound clutch spring 50 radially expands loosening its grip on the clutch surface 48. If the coils of the spring 50 are axially expanded, having been expanded by engagement of the outer tang 60 with the stopping surface 82 of the first protrusion 75, the radially expanded spring coils return to their normal, axially contracted positions. With the clutch spring 50 radially expanded, the shaft 24 is free to turn counterclockwise, winding the belt 14 in the retraction direction or maintaining tension on the belt if worn by an occupant.

Figure 11:
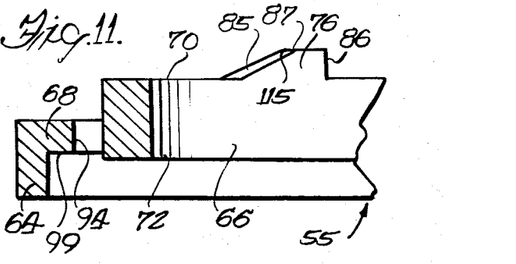
FIG. 11 is an enlarged cross-sectional view taken along line 11—11 of FIG. 7.

The second (7 o'clock) cam stop 76 (FIG. 11) includes a clockwise-facing camming surface 85 that engages the outer tang 60 sweeping in the clockwise direction and a counterclockwise-facing stopping surface 86 which engages the outer tang 60 sweeping in the counterclockwise direction. A top (axially outward) surface 87 of the second cam stop 76 is axially inward of the base 89 (FIG. 8) of the stopping surface 82 of the first cam stop 75, and whether the outer tang 60 engages the stopping surface 86 of the second cam stop 76 in its counterclockwise sweep or whether it sweeps over the top 87 depends upon whether the coils of the spring 50 are axially contracted or expanded.

When the belt 14 is initially protracted for belt buckling, the outer tang 60 is swept into the first cam stop 75 radially and axially expanding the clutch spring 50. The belt 14 is normally over-protracted in order to buckle the belt, and upon release of the belt, the belt retracts to take up the slack causing the outer tang 60 to sweep over the top 87 of the second cam stop 76 and allowing the inner tang 58 to abut the wall 77. Upon hitting the wall, the coils of the spring 50 radially expand and axially contract. As the spring 50 is disengaged from the clutch surface 48, the rewind spring 30 applies tension to the shoulder belt 14 extended across the passenger.

Placing the mechanism in its tension relieving mode is accomplished by protracting the shoulder belt 14 a short distance and then releasing it. From the position where the inner tang 58 abuts the inner wall 77, protraction of the belt 14 and accompanying clockwise rotation of the shaft 24 results in the spring 50 again engaging the clutch surface 48 and turning clockwise with the shaft. The clockwise sweeping outer tang 60 engages the camming surface 85 of the second cam stop 76, tracks to the top surface 87, and because the clutch surface-engaged spring 50 is restrained against axial expansion, drops down along the stopping surface 86. If the belt 14 is not protracted to where the outer tang 60 engages the first cam stop 75, subsequent release of the belt and accompanying counterclockwise shaft rotation causes the outer tang 60 to engage the stopping surface 86 of the second cam stop 76. The rewind spring 30 biasing the shaft in its counterclockwise direction presses the outer tang 60 against this stopping surface 86, enhancing the grip of the spring on the clutch surface 48. Because the outer tang 60 is restrained and the spring 50 firmly gripping the clutch surface 48, the shaft 24 cannot turn counterclockwise, and this position (FIGS. 4, 6) represents the tensionless mode of the mechanism where the tension of the clock like spring 30 acting on the belt 14 is not felt by the occupant.

The tension release mechanism provides a memory whereby the belt 14 may be protracted a short distance from its tension relieving mode as when the passenger leans forward in his seat, without the mechanism being released from its tensionless mode. The belt 14 can be protracted from the tensionless mode, short of the outer tang 60 abutting the stopping surface 82 of the first cam stop 75, and subsequently released to retract only until the outer tang 60 again abuts the stopping surface 86 of the second cam stop 76, again placing the mechanism in its tensionless mode. The play provided by this memory typically represents about five or six inches of seat belt webbing extension. Of course, if the belt 14 is pulled out to where the outer tang 60 abuts the stopping surface 82 of the first cam stop 75 and radially and axially expands, subsequent release of the belt will cause the outer tang 60 to sweep over the top 87 of the second cam stop 76 and allow the inner tang 58 to sweep into the wall 77, releasing the spring 50 from its grip on the clutch surface 48 and causing tension of the reel spring 30 to be applied to the belt.

Figure 12:
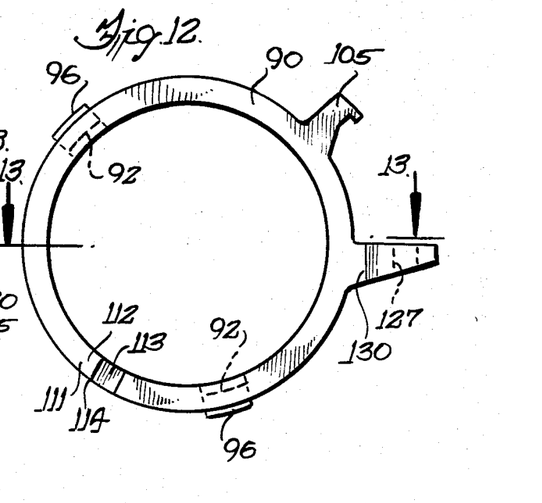
FIG. 12 is an elevation view of a releasing ring that fits over the body member of FIG. 7.

In order to release the mechanism automatically from its tension relieving mode, a device, generally in the form of annular reset ring 90 (FIG. 12), is provided for acting upon the stopping surface-engaged outer tang 60 and lifting it over the top 87 of the second cam stop 76 so that the clutch spring 50 rotates counterclockwise with the shaft 24 to bring the inner tang 58 into engagement with the wall 77 and allow the shaft to rotate freely in the belt retraction direction. The ring 90 is adapted to be disposed around the inner cylindrical portion 66 of the body member along the exterior surface of the annular ring portion 68. The ring 90 is simply assembled to the body 55 by means of a pair of legs 92 that extend axially inward through a pair of arcuate slots 94 in the annular ring portion 68. The legs 92 have broad, radially extending feet 96 which are inserted through enlarged slot portions 98 at the clockwise ends of the slots 94 and thereafter locate along the inner surface 99 (FIGS. 5, 9, 11) of the annular body ring portion 68 holding the ring 90 to the annular ring portion 68.

The ring 90 is rotatable with respect to the annular ring portion 68 to the extent of the length of the arcuate slots 94, although in practice, the rotational freedom of the ring is limited to substantially less relative rotation, assuring that the feet 96 never again align with the enlarged slot openings 98. A spring 100 (FIG. 4) is connected at one end to a catch 101 of the body 55 to a radially extending hook 105 of the ring 90, normally biasing the ring clockwise to where the legs 92 locate at the clockwise ends 108 of the slots 94.

As the means by which the ring 90 acts upon the surface-engaged outer tang 60, the ring carries an axially outward cam 111 which includes a pair of inclined cams surfaces 112, 113 meeting at a common vertex 114. The cam 111 at its vertex 114 is substantially equal in height to the second cam stop 76 of the body member 55, and with the ring 90 in its normal position with its legs 92 at the clockwise ends 108 of the slots 94, the vertex 114 of the ring cam 111 is generally aligned with the junction 115 of the camming surface 85 and top surface 87 of the second cam stop 76. If the ring 90 is rotated clockwise from its normal position, the counterclockwise-facing inclined cam surface 112 will engage the outer end of the outer tang 60 and cam the tang to the top 87 of the second stop 76. Thereupon, the winding spring 30 will cause the shaft 24 and clutch spring 50 to rotate counterclockwise until the inner tang 58 abuts the wall 77, releasing the spring 50 from its grip on the clutch surface 48 and allowing the shaft to rotate freely to fully rewind the belt 14.

In accordance with the present invention, in a seat belt system having a pair of retractors 10, 10′ for retracting two belt portions 14, 14′ the device 90, which releases the tension relieving mechanism associated with one of the retractors 10 from its tensionless mode, is actuated by a cable means 120 (FIG. 1) which extends between the two retractors 10, 10′ and actuates the release device when it senses full retraction of the belt 14′ by the other retractor 10′. The cable 120 not only provides a very simple means of releasing the tension relieving mechanism from its tensionless mode but provides an actuating means which is adaptable to accommodate a dual spool retractor seat belt system irrespective of the relative orientations of the retractors 10, 10′. In a preferred embodiment, one end 121 (FIG. 4) of the cable 120 is attached to the release device 90 and the other end 123 (FIG. 1) to the other retractor 10′ with an end loop 122 of cable entrained around the webbing winding 13′ so that as the webbing winding expands when the belt portion 14′ is retracted, the cable 120 is tugged downward by the winding thereby actuating the release device 90.

In order that a downward tug on the cable 120 will activate the release device or ring 90, the upper end 121 of the cable is extended through an opening 127 (FIGS. 4, 12) in a radially extending tab 130 of the ring 90 and has a ferrule 132 retaining its upper end 121. When the cable 120 is pulled downward, the ferrule 132 pulls against the tab 130 rotating the ring 90 clockwise until the releasing ring protrusion 111 engages the outer tang 60 and lifts it over the second cam stop 76 as hereinbefore described.

Figure 3:
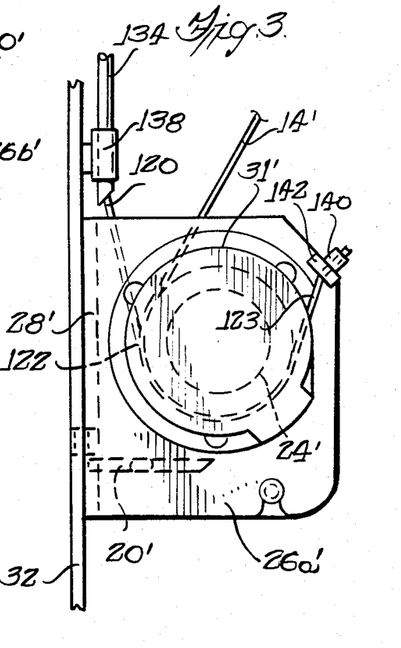
FIG. 3 is an elevation view taken along line 3—3 of FIG. 1.

Below the tension relieving mechanism, the cable 120 extends through a sheath 134 which is held by a clamp (not shown) at its upper end closely adjacent the tension relieving mechanism and at its lower end by another clamp 138 (FIG. 1) closely adjacent the lap belt retractor 10′. The cable 120 emerging from the lower end of the sheath 134 forms the loop 122 around the lap belt winding and its end 123 is held within a fitting 140 at the center of a tie bar 142 that extends between the retractor frame sides 26a′, 26b′. The lead-in segment of the lap belt webbing 14′, of course, extends from its winding on the side of the tie bar 142 remote from the cable loop 122 as seen in FIG. 3. The length of the cable 90 is such that with the belt 14′ protracted and the lap belt winding 13′ relatively small, the cable loop 122 is generally free of the winding and the upper end 121 of the cable 120 held upward by the tab 130 of the ring 90 that is biased to its counterclockwise position. However, as the lap belt winding 13′ enlarges during belt retraction, the winding 13′ pushes outward against the cable loop 122 entrained therearound, requiring that the cable loop expand. Expansion of the cable loop 122 results in the ferrule-held upper cable end 121 tugging downward against the ring tab 130, rotating the ring 90 clockwise against the spring 100 that biases the ring counterclockwise along the body member 55.

Clockwise rotation of the ring 90 causes its counterclockwise facing inclined surface 112 to cam against the restrained outer tang 60 lifting the outer tang over the top 87 of the second cam stop 76 so that the clutch spring 50 rotates counterclockwise along with the shaft 24 until the inner tang 58 hits the wall 77. The coil spring 50 then radially expands permitting the shaft 24 to rotate freely until the shoulder belt 14 is fully retracted.

Figure 1:
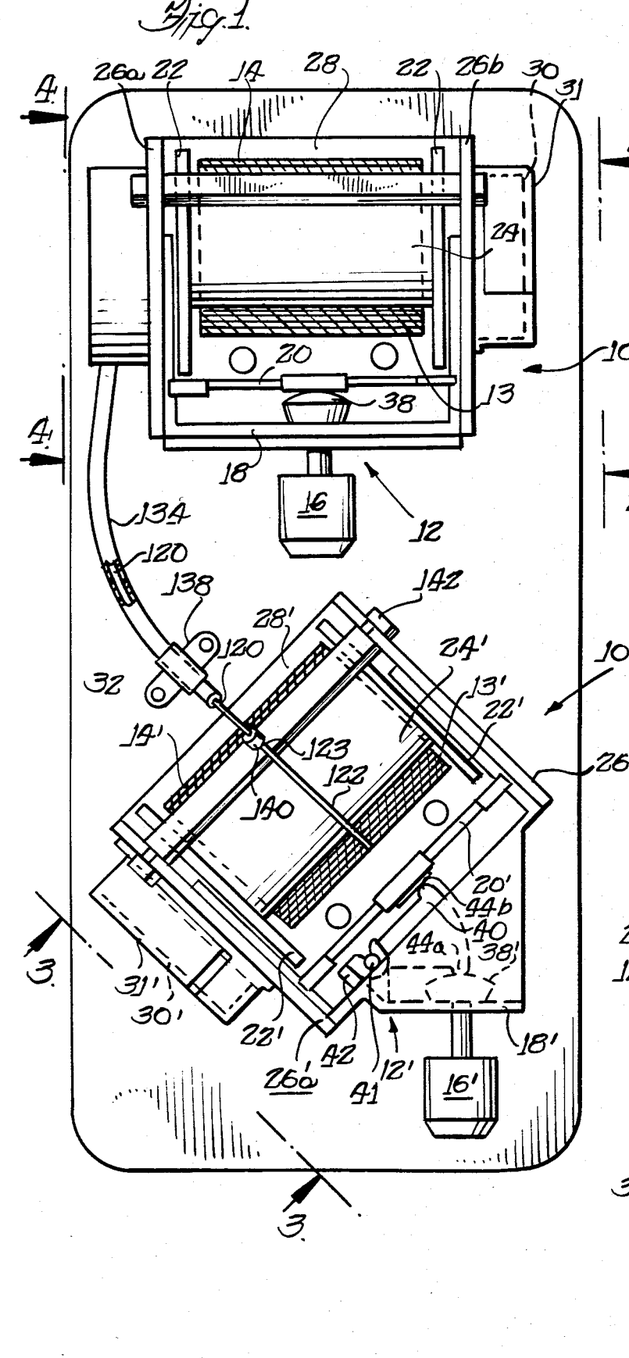
FIG. 1 is an elevation view of a seat belt system embodying various features of the invention having a pair of retractors, including an upper shoulder belt retractor and a lower lap belt retractor.
Figure 2:
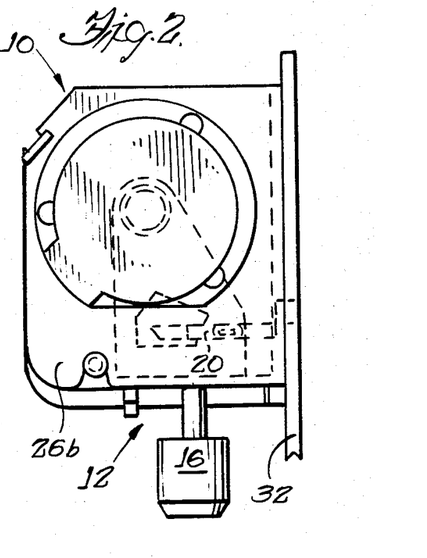
FIG. 2 is a side elevation view taken along line 2—2 of FIG. 1.

The lap belt retractor 10′ shown in FIG. 1 is specifically configured to be mounted with its frame 28′ at an angle to the vertical yet with its pendulum 16′ suspended vertically from a support platform. For a number of reasons including vehicle interior configuration, space utilization or aesthetic reasons, it is frequently desirable that the retractor frame not be mounted vertically. To allow a more standard retractor frame of metal to be used for a wide selection of various angular positions to the vertical, it is preferred to use a molded plastic adapter or insert 200 (FIGS. 16–18) which is molded with a platform 18″ at a predetermined angle to a pair of adapter sidewalls 236 which will be disposed adjacent the metal sides 26a″ and 26b″ of the retractor frame 28″. Thus, for each different angle at which the retractor is mounted relative to the vertical, an adapter 200 will be provided with a platform 18″ at the appropriate associated angle relative to the adapter side walls 236 so that the platform will be a horizontal plane when the retractor is installed.

To assure alignment with the reel axis, the adapter 200 is provided with a pair of annular bosses 240 which fit precisely into holes in the retractor side walls 26a″ and 26b″, which holes are centered on the reel axis. The bosses 240 each have apertures 241 to receive the reel shaft ends which are journaled for rotation in the bosses 240. Thus, the adapter 240 is precisely located relative to the reel shaft and the ratchet wheels thereon to mount the pendulum 16″ and actuator segment or hammer 40″ to actuate the lock bar 20″. The lock bar is also pivotally mounted on the adapter 200, as will be explained.

Figures 16, 17, 18:
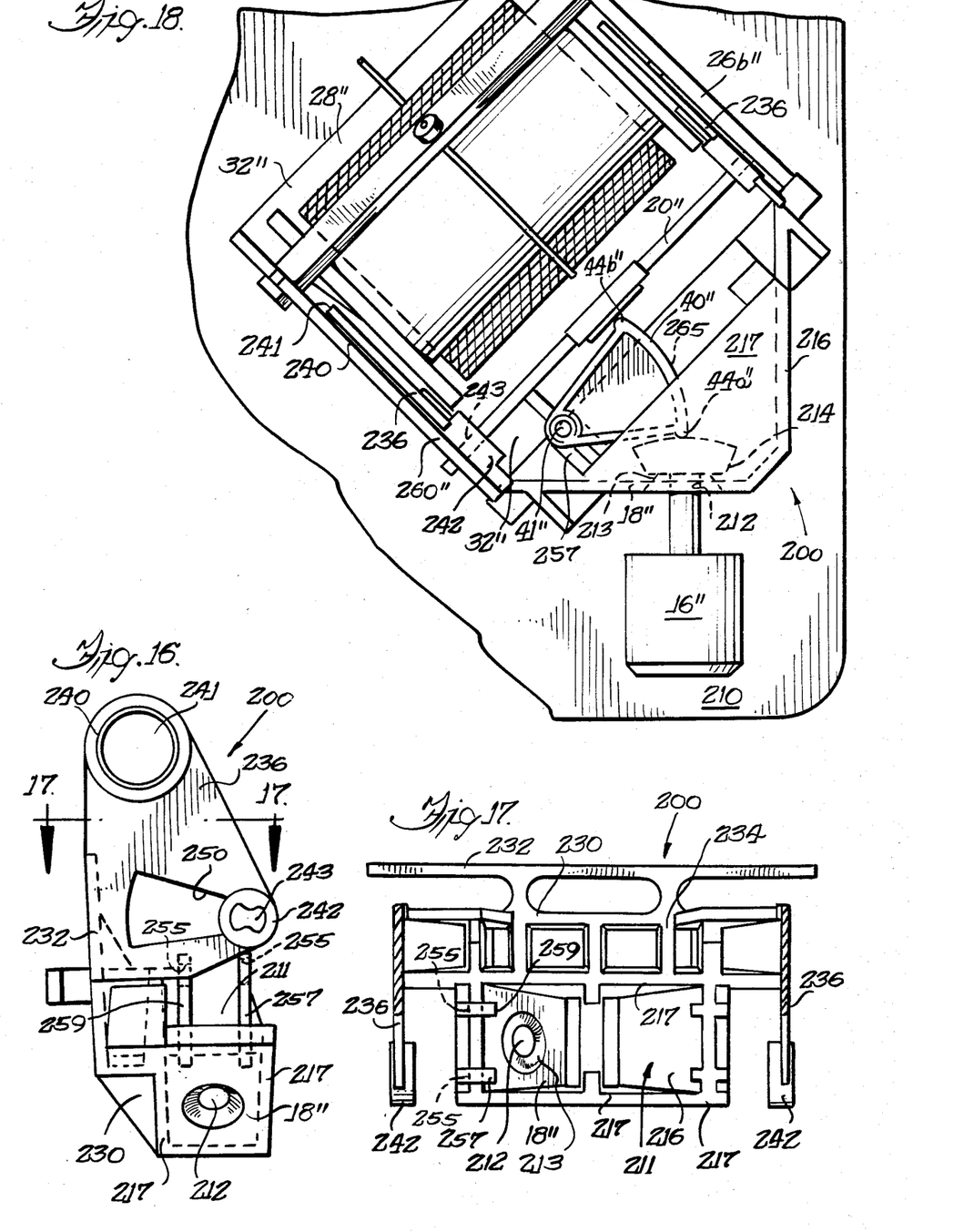
FIG. 16 is a side elevation view of an insert adaptable to a conventional retractor which permits the pendulum to be mounted vertically even through the retractor frame is mounted at an angle relative to the vertical.
FIG. 17 is a cross-sectional view taken along line 17—17 of FIG. 16.
FIG. 18 is an elevation view of a retractor mechanism including the insert of FIG. 16.

The adapter 200 is shown in FIGS. 16 and 17 in its molded vertical position prior to being reoriented to be mounted within a retractor frame 28″ having opposed sides 26a", 26b" and a backing web 32", the frame being mounted within the vehicle 210 at about a 45° angle. It is to be understood, however, that with simple modifications, inserts 200 can be particularly configured to adapt to a wide variety of frame mounting angles. The insert 200 is preferably molded from a relatively rigid and durable plastic so that it is manufactured relatively cheaply in the variety of configurations that accommodate the various angles at which the retractor frame 28" is mounted.

The insert 200 consists of the platform 18" for the pendulum 16" extending along a horizontal plane generally extending through the lower end of the lower frame side 26a". The platform 18" has an opening 212 through which the pendulum 16" extends and upwardly projecting domed surface 213 on which a head 214 of the pendulum normally rests. As best seen in FIG. 17, the platform 18" is one of four walls that are joined together to form a box-shaped chamber at the lower end of the adapter. More specifically, there is an integral wall 216 extending normal to the platform 18" and which when oriented as in FIG. 18 extends vertically to the lower end of the upper frame side 26b". The platform 18", the vertical wall 216 and integral triangular panels 217 define a box shaped chamber 211 in which the actuator segment or hammer 40" pivots on a pin 41" to transmit the swinging motion of the pendulum 16" to a ratchet wheel-engaging pawl 20".

The insert 200 also includes an upper section of frame 230 for mounting it to the retractor frame 28". A broad inner wall 232 on the insert is adapted to mounted to abut the backing plate 32". To provide a strong attachment between the inner wall 232 and the lower chamber 211, there is provided a rib structure 234 which extends from the inner wall 232, spacing the pendulum platform 18" an appropriate distance outward from the backing plate 32" to be centered relative to a lower protrusion 44a" of the hammer 40" pivoting about the pin 41". Integral with the rib structure 234 are opposed sides 236 of the insert which are adapted to extend along the opposed sides 26a", 26b" of the retractor frame 28" engaging the insert 200 thereto. The circular upper bosses 240 and a pair of circular lower bosses 242 extend outward from each insert side 236 into corresponding openings in the frame sides to attach and to locate the insert 200 relative to the retractor frame 28".

The lock bar 20" is preferably pivoted in the insert 200 with opposite ends of the lock bar projecting into molded pivot mounting means 243 formed in the bosses 242. The sides 236 of the insert have aligned sector-shaped openings 250 through which the lock bar 20" projects and to accommodate a swinging motion of the lock bar.

The actuator segment 40" is precisely located relative to the lock bar pivot axis and to the pendulum head by having its pivot pin 41" mounted in spaced apertures 255 in a pair of spaced ribs 257 and 259. The pivot axis for the pivot pin 41" is in a plane perpendicular to the pivot axis of the lock bar 21 and is located below and at right angles to the direction of the lock bar axis.

The actuator segment 40" has an arcuate outer edge 265 (FIG. 18) between its lower end or contact 44a" and its upper end or contact 44b" which translates the vertical displacement of its lower end into an equal displacement of its upper end 44b" which is at 45° angle to the pendulum axis. The actuator segment 44" is designed so that the lock bar receives the same displacement it would have received directly from the pendulum head if the latter were directly actuating the lock bar. Manifestly, distance between upper end 44b" and lower end 44a" is changed with a change in the angle of mounting of the retractor. The particular shape of the actuator segment 44" can be changed considerably from that shown herein which is basically the shape a sector and in the form of a lever.

Several advantages of the invention may be now more fully appreciated. The cable linkage between the belt windings of one retractor reel and the release device of another is simple, lightweight and inexpensive. Its simplicity helps to assure its reliability. Moreover, it is adapted to a dual reel retractor mechanism irrespective of the relative orientations of the two retractors, and minimal engineering is necessary for modifying a dual spool retractor mechanism to the relative retractor orientations most appropriate for different vehicles.

While the invention has been described in terms of a preferred embodiment, modifications obvious to one with ordinary skill in the art may be made without deparing from the scope of the invention. For example, although the invention has been described with respect to drawings showing the retractors operating in particular rotational directions, it is understood that the retractors could operate in the opposite directions, and generally the respective retractors on opposite sides of the vehicle will operate in opposite directions. The invention has been described with reference to a tension relieving mechanism in which tension is relieved by the engagement of a clutch coil spring acting on an extension of a reel shaft; however, the invention is equally applicable to other tension relieving mechanism having release devices which could be adapted to be actuated by the pull of a cable. Both the lap belt and shoulder belt could have tension relieving mechanisms, one of which might be released upon actuation by an opening door and the other of which might be released upon actuation by a cable sensing the growing webbing winding on the initially released retractor.

Various features of the invention are set forth in the following claims.

What is claimed is:

1. A safety belt retractor system comprising:
a first retractor and a second retractor, each of said retractors having its own separate and discrete frame having opposed sides, a reel in each retractor supported for rotation between said sides, a belt portion wound around said reel for protraction from and retraction onto said reel, spring means biasing the reel to retract and rewind the belt portion onto the reel, locking means in each retractor for locking the belt portion against further protraction at the time of sudden vehicle velocity change, said first retractor being spaced at a substantial distance from said second retractor, said second retractor having its reel mounted for rotation about an axis at a substantial angle to the vertical and to the axis of rotation for the first retractor, each of said locking means being discreet and separated from each other and being mounted in a different retractor frame, each of said locking means comprising a separate movable weight member, lock bar and ratchet wheel assembly independently operable of the other, a tension relieving means mounted coaxially with the axis of rotation of the first retractor and associated with said first retractor for relieving spring means tension from the belt portion of said first retractor when worn about a passenger; said tension relieving means allowing the passenger to move forward and backward without releasing, means for releasing said tension relieving means to permit retraction of the belt portion associated with said first retractor; and cable means extending in a nonlinear path between said first and second retractors for actuating said releasing means upon retraction of the belt associated with said second retractor; and guide means guiding the cable for movement along said nonlinear path.

2. A system in accordance with claim 1 wherein said tension relieving means comprises a rotatable member connected to said shaft of said first retractor and a coiled spring which engages said rotatable member to prevent its rotation in the belt portion retraction direction.

3. A system in accordance with claim 2 wherein said coiled spring has an outwardly extending end portion and said first retractor has a stop surface which engages said end portion and prevents said end portion from sweeping in the belt retraction direction, whereupon said coiled spring engages said rotatable member preventing retraction direction rotation of said shaft, and said releasing device has surfaces which shift to disengage said end portion from said stop surface.

4. A safety belt retractor system comprising:

a first retractor and a second retractor, each of said retractors including a frame having opposed sides, a reel in each retractor supported for rotation between said sides, a belt portion wound around said reel for protraction from and retraction onto said reel, spring means biasing the reel to retract and rewind the belt portion onto the reel, locking means in each retractor for locking the belt portion against further protraction at the time of sudden vehicle velocity change, a tension relieving means associated with said first retractor for relieving spring means tension from the belt portion of said first retractor when worn about a passenger;

means for releasing said tension relieving means to permit retraction of the belt portion associated with said first retractor;

cable means extending in a nonlinear path between said first and second retractors for actuating said releasing means upon retraction of the belt associated with said second retractor, said cable means being entrained partially around the winding of said belt portion associated with said second retractor so as to sense increase of the wound diameter of the belt portion of the second retractor as said belt portion is retracted.

* * * * *